United States Patent
Alsop et al.

(10) Patent No.: US 11,947,487 B2
(45) Date of Patent: Apr. 2, 2024

(54) ENABLING ACCELERATED PROCESSING UNITS TO PERFORM DATAFLOW EXECUTION

(71) Applicant: Advanced Micro Devices, Inc., Santa Clara, CA (US)

(72) Inventors: Johnathan Robert Alsop, Bellevue, WA (US); Karthik Ramu Sangaiah, Bellevue, WA (US); Anthony T. Gutierrez, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/852,306

(22) Filed: Jun. 28, 2022

(65) Prior Publication Data

US 2023/0418782 A1  Dec. 28, 2023

(51) Int. Cl.
*G06F 15/82* (2006.01)

(52) U.S. Cl.
CPC .................... *G06F 15/825* (2013.01)

(58) Field of Classification Search
None
See application file for complete search history.

(56) References Cited

U.S. PATENT DOCUMENTS

| | | | |
|---|---|---|---|
| 7,249,351 B1 * | 7/2007 | Songer | G06F 8/451 |
| | | | 717/158 |
| 10,409,599 B2 * | 9/2019 | Gray | G06F 9/30145 |
| 10,459,866 B1 * | 10/2019 | Fleming, Jr. | G06F 13/4027 |
| 10,802,807 B1 * | 10/2020 | Hsu | G06F 11/3495 |
| 2017/0031866 A1 * | 2/2017 | Nowatzki | G06F 9/3836 |
| 2019/0303153 A1 * | 10/2019 | Halpern | G06F 9/4494 |
| 2020/0319852 A1 * | 10/2020 | Sakato | G11C 7/1006 |

OTHER PUBLICATIONS

Fell, A. et al., Force-Directed Scheduling for Data Flow Graph Mapping on Coarse-Grained Reconfigurable Architectures, 2014, IEEE, 8 pages. (Year: 2014).*

Koliogeorgi, K. et al., Dataflow acceleration of Smith-Waterman with Traceback for high throughput Next Generation Sequencing, 2019, IEEE, pp. 74-80. (Year: 2019).*

Theodoridis, G., et al., "A Survey of Coarse-Grain Reconfigurable Architectures and Cad Tools", in Fine and Course-Grain Reconfigurable Computing, Springer, 2007, 61 pgs.

* cited by examiner

*Primary Examiner* — Eric Coleman
(74) *Attorney, Agent, or Firm* — Volpe Koenig (57) ABSTRACT

Methods and systems are disclosed for performing dataflow execution by an accelerated processing unit (APU). Techniques disclosed include decoding information from one or more dataflow instructions. The decoded information is associated with dataflow execution of a computational task. Techniques disclosed further include configuring, based on the decoded information, dataflow circuitry, and, then, executing the dataflow execution of the computational task using the dataflow circuitry.

20 Claims, 6 Drawing Sheets

ENABLING ACCELERATED PROCESSING UNITS TO PERFORM DATAFLOW EXECUTION

BACKGROUND

Today's accelerated processing units (APUs) are programmable and sufficiently flexible to be used for a broad range of parallel workloads. However, this flexibility comes at a cost. Generally, APU processing pipelines are designed to maximize parallel utilization, providing features that enable dynamic scheduling of instructions, routing operands, and thread-level control divergence for arbitrary parallel compute kernels. The execution of such features consumes energy, for example, to track data, structural dependencies, and control flow, as well as to decode instructions and to store intermediate values in a massive register file for use at some unpredictable time in the future.

BRIEF DESCRIPTION OF THE DRAWINGS

A more detailed understanding may be had from the following description, given by way of example in conjunction with the accompanying drawings wherein.

DETAILED DESCRIPTION

Workloads with fixed and regular compute and dataflow can benefit from a dataflow-style execution model. Examples of these workloads include those that involve tensor algebra and dense neural networks. Thus, when a workload's control flow is predictable or when the data processed are being accessed in a manner that allows static mapping of the workload to the hardware, then the dependency tracking and the dynamic scheduling that are regularly carried out by the APU may be unnecessary and wasteful in terms of performance and energy efficiency. Techniques are needed to enable an APU to take advantage of workloads that have fixed and regular compute and dataflow.

A dataflow execution mode is enabled in an APU, during which time the APU performs a dataflow execution. When operating in the dataflow execution mode, to reduce power consumption, circuitries of the APU that are not in use can be placed in lower power states. The APU can be transitioned, from its normal (default) compute mode, to a dataflow execution mode when processing workloads that can be mapped to dataflow architectures. The dataflow execution mode can be implemented by augmenting instructions directed at the APU into dataflow instructions, containing information that can be used to configure APU circuitry to perform a desired dataflow execution.

Aspects of the present disclosure describe methods for performing dataflow execution by an APU. The methods comprise decoding information from one or more dataflow instructions. The information is associated with dataflow execution of a computational task. The methods further comprise configuring, based on the decoded information, dataflow circuitry, and executing the dataflow execution of the computational task using the dataflow circuitry.

Aspects of the present disclosure also describe systems for performing dataflow execution by an APU. The systems comprise a decoder circuit configured to decode information from one or more dataflow instructions. The information is associated with dataflow execution of a computational task. The systems further comprise a setup circuit that configures dataflow circuitry based on the decoded information, and execution circuitry configured to execute the dataflow execution of the computational task using the dataflow circuitry.

Furthermore, aspects of the present disclosure describe a non-transitory computer-readable medium comprising hardware description language instructions describing an APU adapted to perform a method for performing dataflow execution. The methods comprise decoding information from one or more dataflow instructions. The information is associated with dataflow execution of a computational task. The methods further comprise configuring, based on the decoded information, dataflow circuitry, and executing the dataflow execution of the computational task using the dataflow circuitry.

Figure 1A:
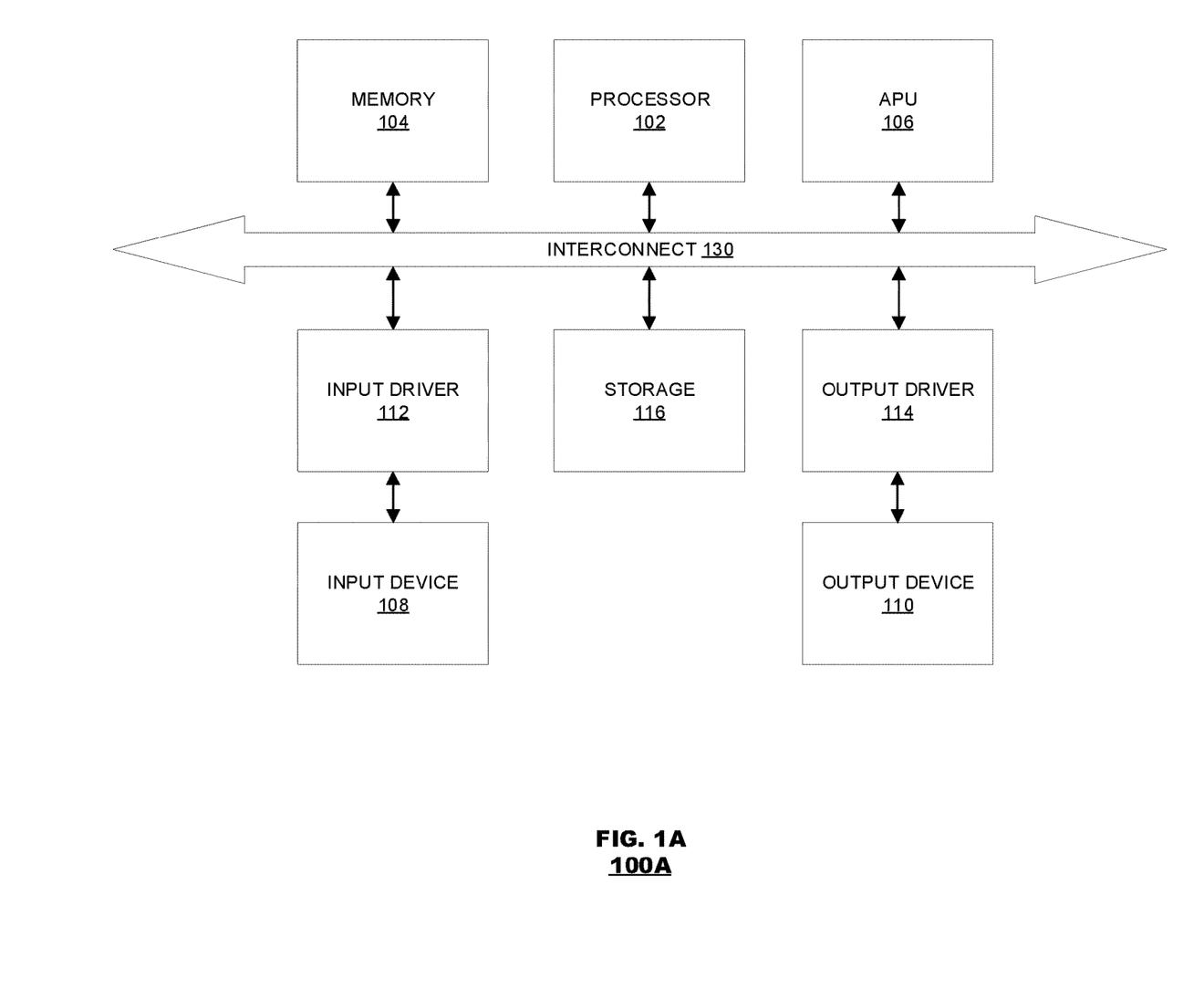
FIG. 1A is a block diagram of an example device, based on which one or more features of the disclosure can be implemented.

FIG. 1A is a block diagram of an example device 100A, based on which one or more features of the disclosure can be implemented. The device 100A can be, for example, a computer, a gaming device, a handheld device, a set-top box, a television, a mobile phone, or a tablet computer. Components of the device 100A include a host processor 102, an APU 106, memory 104, storage 116, an input device 108, and an output device 110. Additional components can be an input driver 112 and an output driver 114. The device's components are communicatively connected via a bus system, such as an interconnect 130.

The host processor 102 includes a central processing unit (CPU) or one or more cores of CPUs. The APU 106 can represent a highly parallel processing unit, such as graphics processing unit (GPU) that may be employed to execute graphics operations and non-graphics operations. The host processor 102 and the APU 106 may be located on the same die or on separate dies. The memory 104 can be located on the same die as the host processor 102, or can be located separately from the host processor 102. The memory 104 include volatile or non-volatile memory, for example, random access memory (RAM), dynamic RAM (DRAM), a cache, or a combination thereof.

The storage 116 can include fixed or removable storage, for example, a hard disk drive, a solid-state drive, an optical disk, or a flash drive. The input device 108 can represent one or more input devices, such as a keyboard, a keypad, a touch screen, a touch pad, a detector, a microphone, an accelerometer, a gyroscope, a biometric scanner, or a network connection (e.g., a wireless local area network card for receipt of wireless IEEE 802 signals). The output device 110 can represent one or more output devices, such as a display, a speaker, a printer, a haptic feedback device, one or more lights, an antenna, or a network connection (e.g., a wireless local area network card for transmission of wireless IEEE 802 signals).

The input driver 112 communicates with the host processor 102 and the input device 108, and facilitates the receiving of input from the input device 108 to the host processor 102. The output driver 114 communicates with the host processor 102 and the output device 110, and facilitates the sending of output from the host processor 102 to the output device 110. In an aspect, the input driver 112 and the output driver 114 are optional components, and the device 100A can operate in the same manner when the input driver 112 and the output driver 114 are not present.

The APU 106 can be configured to accept compute commands and graphics rendering commands from host processor 102, to process those compute and graphics rendering commands, and/or to provide output to a display (output device 110). As described in further detail below, the APU 106 includes one or more parallel processing units configured to perform computations, for example, in accordance with a single instruction multiple data (SIMD) paradigm. Thus, although various functionalities are described herein as being performed by or in conjunction with the APU 106, in various alternatives, the functionalities described as being performed by the APU 106 can be additionally or alternatively performed by other computing devices having similar capabilities that are not driven by a host processor (e.g., host processor 102) and that can be configured to provide, for example, graphical output to a display. Whether or not a processing system can perform processing tasks in accordance with a SIMD paradigm, the processing system can be configured to perform the functionalities described herein.

Figure 1B:
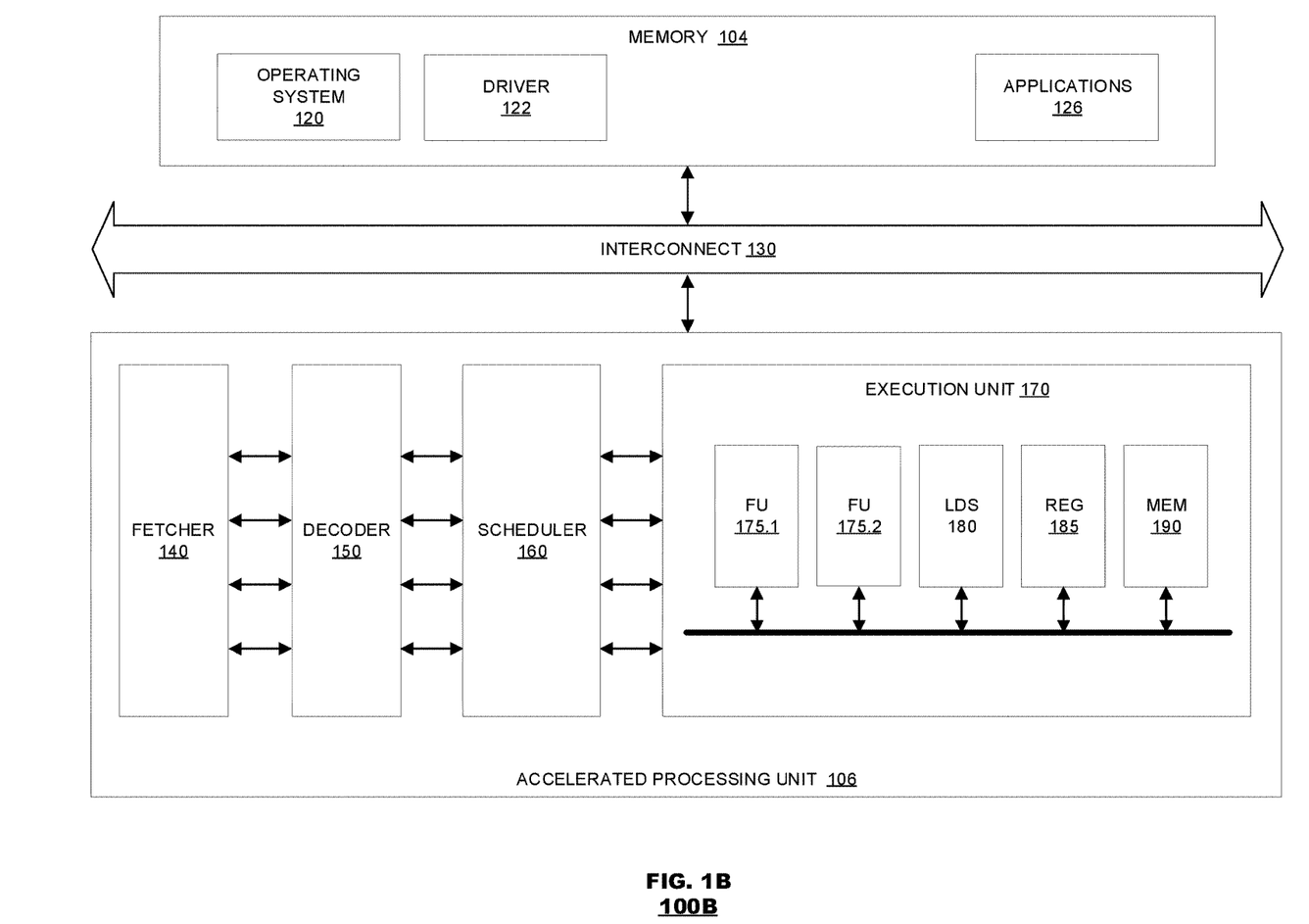
FIG. 1B is a block diagram of an example system, demonstrating an APU, based on which one or more features of the disclosure can be implemented.

FIG. 1B is a block diagram of an example system 100B, demonstrating an accelerated system, based on which one or more features of the disclosure can be implemented. FIG. 1B illustrates in further detail the execution of computational tasks by the APU 106. The host processor 102 (of FIG. 1A) can maintain in memory 104 one or more modules for execution by the host processor 102. The modules include an operating system 120, a driver 122, and applications 126. These modules can control various features of the operation of the host processor 102 and the APU 106. For example, the operating system 120 can provide system calls, that is, application programming interfaces (APIs), that can be employed by applications 126 to directly interface with the hardware. The driver 122 can control the operation of the APU 106 by, for example, providing APIs to applications 126 executing on the host processor 102 to access various functionalities of the APU 106.

The APU 106 can execute commands related to graphics operations and non-graphics operations, including either parallel processing or sequential processing and either ordered or non-ordered processing. The APU 106 can be used for executing graphics pipeline operations—such as operations that process pixels and/or geometric computations (e.g., rendering an image to the display (output device 110))—based on commands received from the host processor 102. The APU 106 can also execute processing operations that are not related to graphics operations, such as operations related to processing of multi-dimensional data, physics simulations, computational fluid dynamics, or other computational tasks, based on commands received from the host processor 102.

The APU 106 includes a fetcher 140, a decoder 150, a scheduler 160, and an execution unit 170. The execution unit 170 includes functional units (FUs) 175.1-2 (computing units, collectively denoted 175), local shared memory (denoted LDS) 180, a register file (denoted REG) 185, and a memory interface (denoted MEM) 190. The MEM 190 provides the components 175, 180, 185 of the execution unit 170 with an interface to global memory 104. The fetcher 140 and the decoder 150 are configured, respectively, to load and to decode instructions that direct the execution of computational tasks assigned to the APU 106 by an application 126 running on the host processor 102. The scheduler 160 is configured to determine what task can or should be scheduled next based on dependency checks and what functional unit 175 a task should be assigned to, based on the availability of the FUs. Then, the instructions proceed to be executed by their respective assigned FU 175.

Generally, each FU, e.g., 175.1, has one or more SIMD units (not shown) that can perform operations (assigned to the FU) in a parallel manner according to a SIMD paradigm. The SIMD paradigm is one in which multiple processing elements share a single program control flow unit and a program counter, and, thus, can execute the same program but on different data. In one example, each SIMD unit can run 64 lanes (i.e., threads), where each lane executes the same instruction at the same time as the other lanes in the SIMD unit, but executes that instruction on different data.

The basic unit of execution in an FU is a work-item. Typically, each work-item represents a single instantiation of a program that can be executed in parallel in a particular lane. Work-items can be executed simultaneously as a "wavefront" (or a "wave") on a single SIMD. The waves can also be executed sequentially on a single SIMD unit or partially or fully in parallel on different SIMD units. Thus, a wave can be thought of as a collection of work-items that can be executed simultaneously on a single SIMD unit. If commands received from the host processor 102 indicate that a particular program is to be parallelized to such a degree that the program cannot be executed on a single SIMD unit simultaneously, then that program can be broken up into waves that can be parallelized on two or more SIMD units, serialized on the same SIMD unit, or both parallelized and serialized as needed. The scheduler 160 can be configured to launch various waves on the different FUs 175 and their respective SIMD units.

The parallelism afforded by the FUs 175 is suitable, for example, for graphics-related operations such as operations on pixel values (e.g., filter operations), operations on geometrical data (e.g., vertex transformations), and other graphics-related operations. For example, an application 126, executing on the host processor 102, can involve computations to be performed by the APU 106. An application 126 can use APIs provided by the driver 122 to issue processing instructions to the APU 106. The processing instructions are fetched 140, decoded 150, and, then, provided to the scheduler 160. The scheduler 160 may translate the processing instructions into computational tasks that are assigned to the FUs for execution in parallel. For example, the scheduler 160 may receive a processing instruction to be performed on data (e.g., 1024 pixels of an image). In response, the scheduler 160 can chunk the data into groups (e.g., each group containing data required for the processing of 64 pixels) and launch waves in one or more FUs, each wave being associated with a group of data and instructions to perform on the data. For example, the scheduler 160 may launch 16 waves (e.g., each in charge of processing 64 pixels) to be executed in SIMDs of one or more FUs.

Aspects disclosed herein enable a dataflow execution mode in an APU. By transitioning into a dataflow execution mode, the power consumed by circuitry of the APU can be reduced and, thus, overall performance can be increased. The APU can transition, from its normal compute mode, to a dataflow execution mode when processing workloads that can be mapped to dataflow architectures—such as workloads that involve operations of streaming static dataflow patterns, vector-to-scalar sum or product, vector-to-vector element-wise summation or product, vector dot product, counting instances of an element in a string, vector reduction, prefix sum, or address generation for issuing a streaming batch of loads/stores. As disclosed herein, the dataflow execution mode can be implemented by augmenting (e.g., by a compiler) instructions directed at the APU into dataflow instructions. The latter contain information that can be used to configure circuitry of the execution units 170 to perform dataflow execution, as further disclosed in reference to FIG. 2.

Components of the APU 106 (e.g., decoder 150 and execution unit 170) can be implemented via hardware (e.g., logic circuitry), software or a combination of hardware and software. For example, decoder 150 may be a decoder circuit which includes hardware logic circuitry configured to decode instructions that direct the execution of computational tasks assigned to the APU 106. Execution unit 170 may include execution circuitry configured to execute instructions and tasks to perform dataflow execution of the APU 106.

Figure 2:
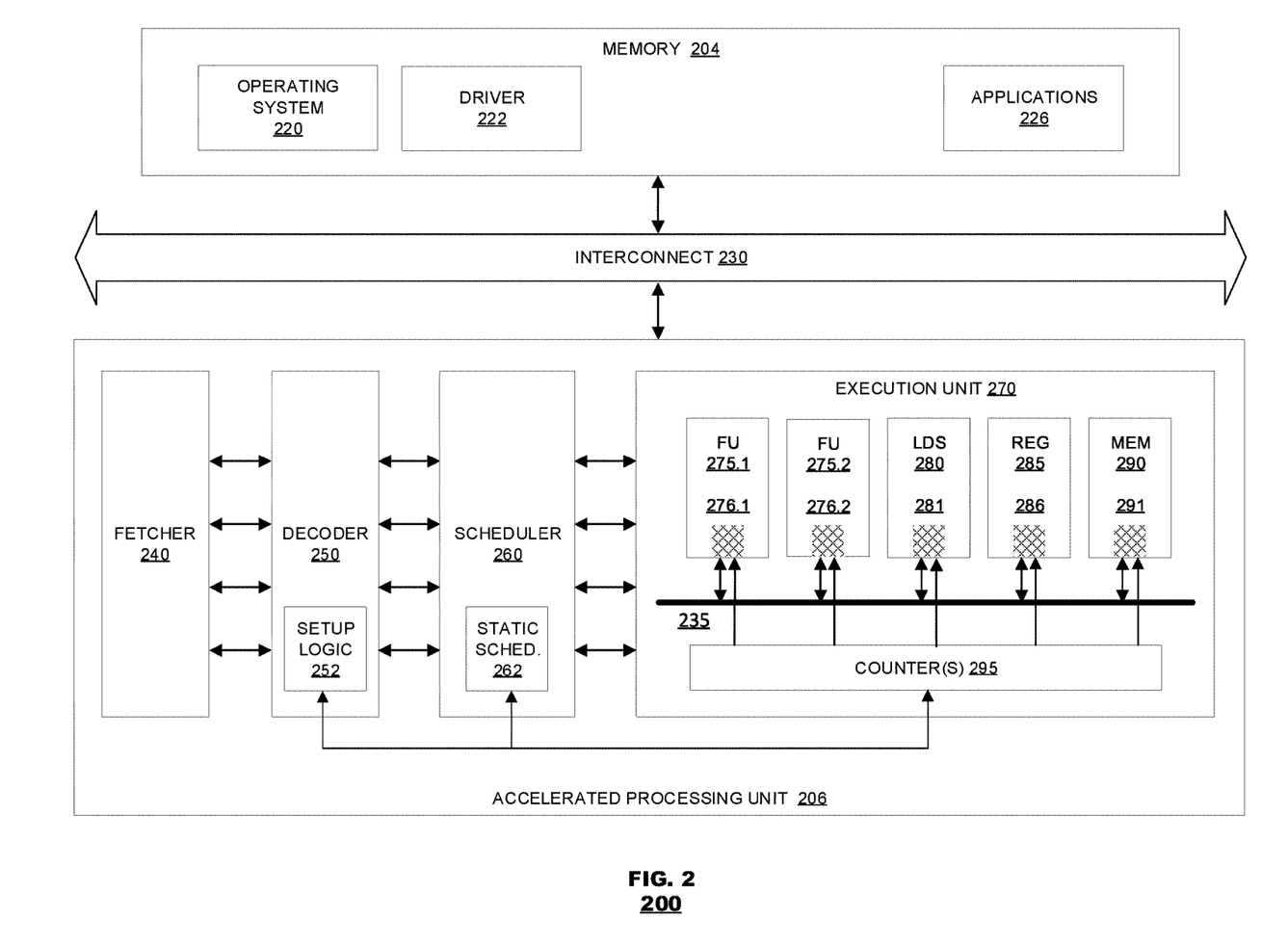
FIG. 2 is a block diagram of an example system, demonstrating an APU with a dataflow execution mode, based on which one or more features of the disclosure can be implemented.

FIG. 2 is a block diagram of an example system 200, demonstrating an APU 206 with a dataflow execution mode, based on which one or more features of the disclosure can be implemented. Generally, and when operating in a normal mode, the operation of APU 206 is similar to that described in reference to APU 106 of FIG. 1B. Accordingly, the host processor 102 can maintain in memory 204 one or more modules for execution by the host processor 102. The modules include an operating system 220, a driver 222, and applications 226. The driver 222 can control operation of the APU 206 by, for example, providing APIs to applications 226 executing on the host processor 102 to access various functionalities of the APU 206.

As described with reference to APU 106 of FIG. 1B, APU 206 includes a fetcher 240, a decoder 250, a scheduler 260, and an execution unit 270. The execution unit 270 includes functional units (FUs) 275.1-2 (computing units, such as 175.1-2, collectively denoted 275), local shared memory (denoted LDS) 280, a register file (denoted REG) 285, and a memory interface (denoted MEM) 290. The MEM 290 provides the components 275, 280, 285 of the execution unit 270 with an interface to global memory 204. The fetcher 240 and the decoder 250 are configured, respectively, to load and to decode instructions that direct the execution of computational tasks assigned to the APU 206 by an application 226 running on the host processor 102. The scheduler 260 is configured to determine what tasks can or should be scheduled next based on dependency checks and what FU 275 a task should be assigned to, based on the availability of the FUs. Then, the instructions proceed to be executed by their respective assigned FUs 275. Generally, instructions (scheduled for execution) load respective operands from a register file or a register cache (or receive the respective operands via a bypass path). If a destination register is provided, the computational results of a FU are written back to that destination register (or to a register destination buffer).

FIG. 2 also highlights components of system 200 that can be added to system 100B to facilitate a dataflow execution mode. The highlighted components are setup logic 252, static scheduler 262, and counters 295. Additionally, programmable components 276, 281, 286, and 291 (represented by the patterned squares in FIG. 2)—such as multiplexers, routing logic, and registers—are used to enable the dataflow execution mode.

In a dataflow execution mode, the dataflow operation is configured 252 based on one or more dataflow instructions, obtained by augmenting instructions that are directed at the APU 206 to perform a computational task. That is, instructions used by the APU when operating in a normal compute mode are extended to facilitate control over the dataflow execution. Thus, based on information extracted from the decoded 250 instructions, the setup logic 252 can configure hardware components (namely, dataflow circuitry) in the FUs 275 to have the data connectivity and operational cycles to perform the dataflow execution. This can be done by the one or more of the programmable components 276, 281, 286, 291, for example, based on the one or more counters 295. The setup logic 152 can also direct the scheduler 260 to switch to static scheduling, performed by the static scheduler 262. Then the dataflow execution is launched to be carried out by the configured dataflow circuitry for a predetermined period of time. During this time period, circuitry that are associated with dynamic scheduling 260, access to the register file 285, and data dependence tracking in the execution unit 270 may be clock-gated or power-gated since these are not needed for the dataflow execution.

Figure 3:
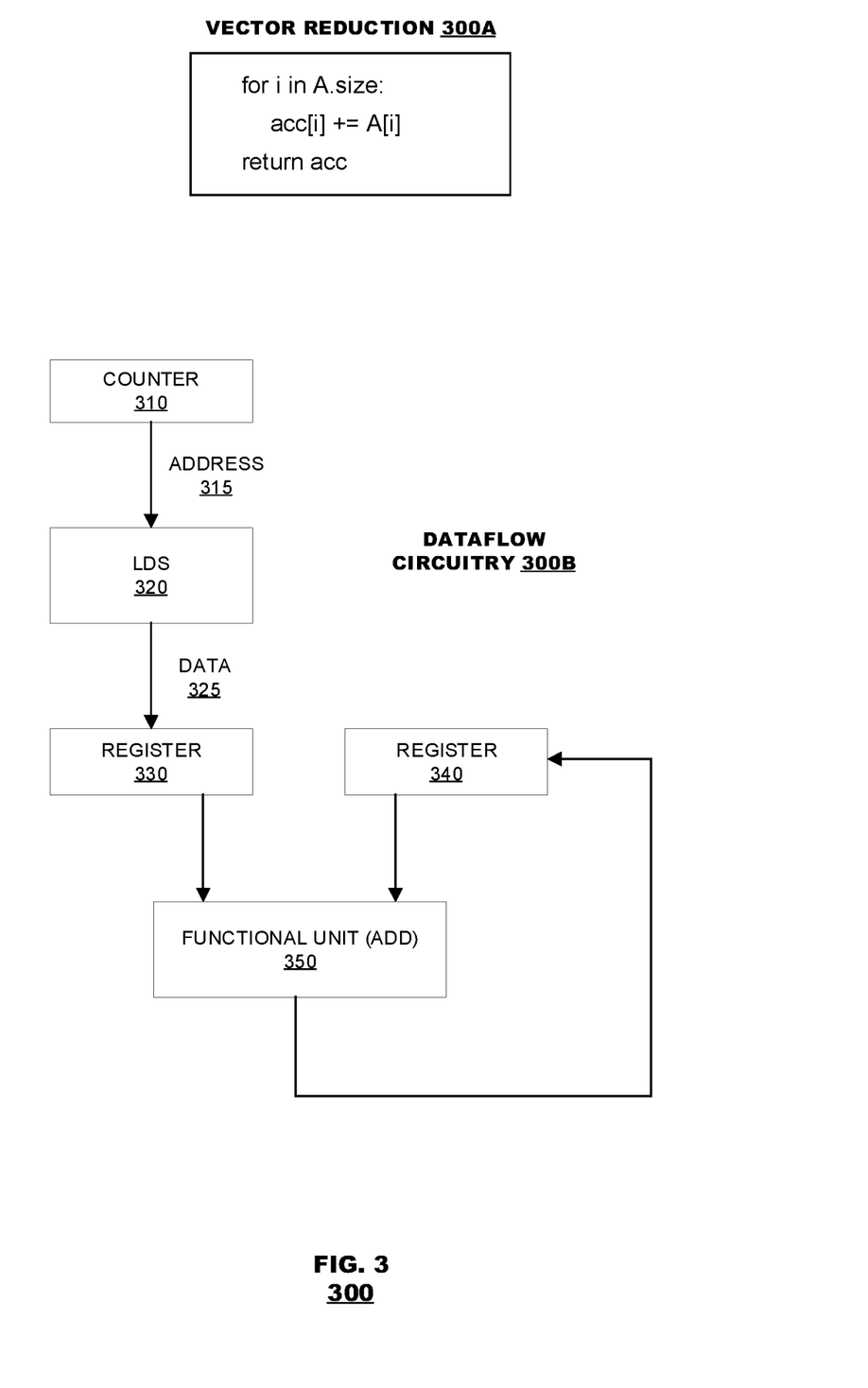
FIG. 3 illustrates an example operation in a dataflow execution mode for a vector reduction dataflow, based on which one or more features of the disclosure can be implemented.
Figure 4:
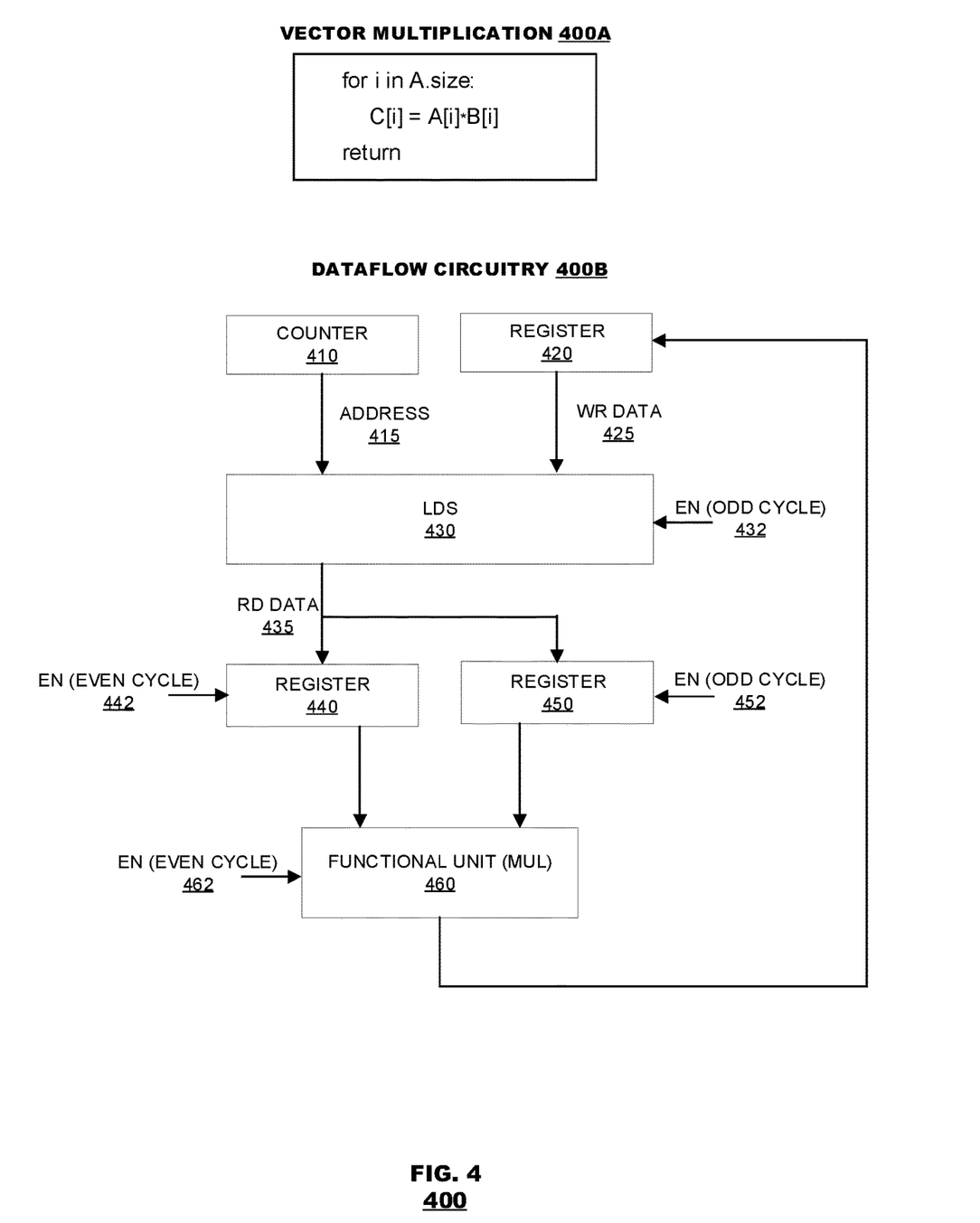
FIG. 4 illustrates an example operation in a dataflow execution mode for an elementwise vector multiplication dataflow, based on which one or more features of the disclosure can be implemented.

To perform a computational operation in a dataflow pipeline, dataflow circuitry can be hardwired according to the operation the circuitry is designed to perform. Dataflow circuitry, typically, include one or more FUs that are hardwired to programmable components (e.g., multiplexers, routing logic, and/or registers 276, 281, 286, 291) as well as one or more counters 295. The programmable components can be programmed to control the latching (writing or routing) of data along the pipeline of the dataflow circuitry. This can be done by enabling/disabling the multiplexers and/or by setting the registers based on the output of a counter 295. FIG. 3 and FIG. 4 show two example for specific dataflow circuitry that can be integrated into an APU.

Components of the APU 206 (e.g., decoder 250, execution unit 270 and setup logic 252) may be implemented via hardware (e.g., logic circuitry), software or a combination of hardware and software. For example, decoder 250 may be a decoder circuit which includes logic circuitry configured to decode instructions and information which direct the execution of computational tasks assigned to the APU 206. Execution unit 270 may include execution circuitry configured to execute instructions and tasks, such executing computational tasks using the dataflow circuitry. Setup logic 252 may be a setup logic circuit which includes hardware circuitry which configures the dataflow circuitry to perform the dataflow execution based on the decoded information.

FIG. 3 illustrates an example operation in a dataflow execution mode for a vector reduction dataflow 300, based on which one or more features of the disclosure can be implemented. FIG. 3 demonstrates the mapping of the vector reduction pseudocode 300A to dataflow circuitry 300B, residing in one of the FU 275. The dataflow circuitry 300B may be hardwired to perform the vector reduction operation, including a counter 310 (e.g., 295) that is added to support the dataflow execution. The registers 330, 340 may be programmable components (e.g., 276). The counter 310 is used for incrementing the load address 315 of the LDS 320 (e.g., 280). Using the counter in this manner eliminates the need to perform dependency checking, memory coalescing, and register accessing—operations that otherwise take place when the address is calculated individually for each thread. As shown, based on the address 315 provided by the counter 310, data 325 is loaded from the LDS 320 to a register 330 (the data loaded are associated with the "A" array in the pseudocode 300A). Register 340 is used to accumulate the data resulting from the vector reduction operation (the data accumulated are associated with the "acc" variable in the pseudocode 300A). Then, the FU 350 performs the adding operation—adding the loaded data in register 330 to the accumulated data in register 340.

FIG. 4 illustrates an example operation in a dataflow execution mode for an elementwise vector multiplication dataflow 400, based on which one or more features of the disclosure can be implemented. FIG. 4 demonstrates the mapping of the element-wise vector multiplication pseudocode 400A to dataflow circuitry 400B, residing in one of the FUs 275. The dataflow circuitry 400B may be hardwired to perform the vector multiplication operation, including a counter 410 (e.g., counter 295 of FIG. 2) that is added to support the dataflow execution. The registers 420, 440, 450 may be programmable components (e.g., 276 of FIG. 2). Two cycles of operations, denoted odd cycle 432, 452 and even cycle 442, 462 are used to control the dataflow. In even cycles (e.g., triggered by even addresses in the counter 410), a reading of data 435 is enabled 442 from the LDS 430 to the first input register 440 and a multiplication computation is enabled 462 at the FU 460. In odd cycles (e.g., triggered by odd addresses in the counter 410), a reading of data 435 is enabled 452 from the LDS 430 to the second input register 450 and a writing of data 425 is enabled 432 from register 420 to the LDS 430. The registers 440, 450 hold the data elements to be multiplied (the data elements associated with the "A" and the "B" arrays in the pseudocode 400A) and register 420 holds the result of the multiplication (the corresponding data element associated with the "C" array in the pseudocode 400A).

Note that in both of the dataflow examples (FIGS. 3-4), intermediate values need not be stored in registers, and dependency checking, dynamic scheduling overheads, and bypass detection can be disabled for the duration of the dataflow execution mode.

Figure 5:
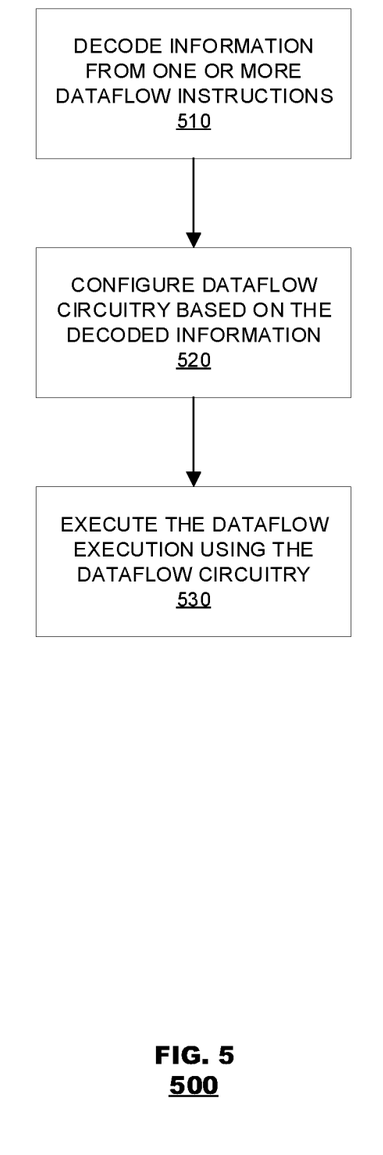
FIG. 5 is a flowchart of an example method for performing dataflow execution within an APU, based on which one or more features of the disclosure can be implemented.

FIG. 5 is a flowchart of an example method 500 for performing dataflow execution within an APU, based on which one or more features of the disclosure can be implemented. The method 500, in step 510, begin by decoding information from one or more dataflow instructions. The decoded information is associated with the dataflow execution of a computational task. Based on the decoded information, in step 520, the method 500 configures dataflow circuitry. Then, in step 530, the method 500 executes the dataflow execution of the computational task using the dataflow circuitry. During the dataflow execution, the APU 206 operates in a dataflow execution mode. In this mode of operation, a circuitry that is not used can be placed in a clock-gated or a power-gated state. Such circuitry may be circuitry that performs scheduling 260 (except for static scheduling 262 that is applied during the dataflow execution) and performs dependency tracking, for example. Thus, logic is added that enables the APU to transition to operation in a dataflow execution mode. When the dataflow execution is completed, the APU has to be transitioned out of the dataflow execution mode. To that end, logic is added that places the APU 106 back into operation in a normal compute mode.

Setup information can be coded by a compiler in one or more dataflow instructions. In an aspect, one dataflow instruction may be used to specify a location in memory that contains the setup information in a predefined format. The setup information defines the operation of the dataflow circuitry. For example, programmable components—such as multiplexers, routers, and registers (e.g., 276, 281, 286, and 291)—can be used to dynamically configure dataflow circuitry based on the content of one or more counters 295. Thus, programmable components can be used to control the connectivity among components of the dataflow circuitry and to control operational cycles of the dataflow circuitry (as explained in reference to FIG. 4). For example, the operation of dataflow circuitry can be defined by specifying: which intermediate registers get updated in each cycle, which registers remain static in each cycle, and how to writeback the result. Setup information can specify different behaviors of multiplexers in different cycles of a dataflow operation. Additionally, arbitrary connections can be made via the programmable multiplexers 276.1-2 that direct the results from a source FU to a destination FU via a shared bus 235 (FIG. 2). In an aspect, it may be determined whether the configuration of the dataflow circuitry is valid. And, if the configuration was determined to be a non-valid configuration, the APU executes the respective computational task in a normal compute mode.

Programmable storage can be used in dataflow operations. Programmable storage can include register file cache (or operand cache) that selectively cache operands based on known future use. Dataflow instructions with information about the size of the register file cache can direct the cache to store operands such that they can be consumed by future instructions without reading from the main register file 185. In such a case, the compiler will select the appropriate instruction window size to match the size of the operand caches. Such a technique can be used across architectures with varying operand cache sizes.

In an aspect, state machines can be used to control the operation of dataflow circuitry. To that end, one or more counters 295 can be integrated into the dataflow circuitry, as demonstrated with respect to FIG. 3 and FIG. 4. A counter may be used to accumulate N elements before enabling passing a result (or a 'ready' signal) to another component of the dataflow circuitry (e.g., a register, an LDS, or a FU)—if the prior operand may have some non-deterministic delay. The state machine may be implemented in multiple ways. For example, a programmable lookup table may be used in which each entry contains the enable-bits for each FU (or a register) for a given cycle in a loop. For example, two entries are illustrated in FIG. 4, one for even cycles and one for odd cycles.

In another aspect, a compiler can identify when a sequence of instructions will meet its own set of dependencies if it is scheduled sequentially. In such a case the compiler can augment the sequence of instructions into one or more dataflow instructions. As described above, such dataflow instructions are used to configure dataflow circuitry to perform the computational tasks specified by the sequence of instructions. Additionally, the dataflow instructions can direct the disabling of wavefront arbitration functionality. Instead, a static scheduling 262 can be used. For example, if the compiler can generate a sequence of instructions with minimal dependencies such that all dependencies can be serviced by bypass paths or operand caches without any pipeline bubbles, the compiler can direct the hardware to disable wavefront arbitration.

In yet another aspect, a compiler can perform validity checks to determine whether a given computational task is impossible to be performed by dataflow execution. As mentioned above, this validity check can be performed dynamically by the decoder 250. Thus, based on information decoded from dataflow instructions, it can be determined whether the dataflow can be mapped to dataflow circuitry. For example, a bit-vector can be used to represent whether a component of a dataflow execution has been used, with each component corresponding to one bit of the bit-vector. During the decoding of a dataflow instruction, the bit of the bit-vector that corresponds to a required component of a dataflow execution is examined. If this bit value has already been set, the decoder will flag a mapping error. If it has not, the setup logic 252 configures the component as requested and sets the bit in the bit vector. After the dataflow execution is completed, the bit vector can be reset back to zero. If the specified dataflow cannot be mapped to the target hardware, the APU 106 executes the task in a normal compute mode.

It should be understood that many variations are possible based on the disclosure herein. Although features and elements are described above in particular combinations, each feature or element can be used alone without the other features and elements or in various combinations with or without other features and elements.

The methods provided can be implemented by components associated with the host processor 102 (of FIG. 1) and the APU 206 (of FIG. 2)—for example, a general-purpose computer, a processor, or a processor core. Suitable processors may include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such components can be manufactured by configuring a manufacturing process using the results of processed hardware description language (HDL) instructions and other intermediary data including netlists (such as instructions capable of being stored on a computer readable media). The results of such processing can be mask works that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general-purpose computer or a processor. Examples of a non-transitory computer-readable medium include read only memory (ROM), random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing dataflow execution by an accelerated processing unit (APU), comprising:
   augmenting a sequence of instructions into one or more dataflow instructions, responsive to the sequence of instructions meeting its own dependencies;
   configuring dataflow circuitry based on information from one or more dataflow instructions, the information being associated with dataflow execution of a computational task; and
   executing the dataflow execution of the computational task using the dataflow circuitry.

2. The method of claim 1, wherein the configuring further comprises:
   dynamically configuring the dataflow circuitry by programmable components based on one or more counters.

3. The method of claim 2, wherein the configuring further comprises:
   controlling operational cycles of the dataflow circuitry by the programmable components.

4. The method of claim 2, wherein the configuring further comprises:
   controlling connectivity among components of the dataflow circuitry by the programmable components.

5. The method of claim 1, further comprising:
   before the executing of the dataflow execution, transitioning the APU into a dataflow execution mode, during which a circuitry of the APU that is not used for the dataflow execution is placed in a power-gated or a clock-gated state.

6. The method of claim 5, further comprising:
   after the executing of the dataflow execution, transitioning the APU into a normal compute mode, activating the circuitry of the APU that was placed in a power-gated or a clock-gated state.

7. The method of claim 1, further comprising:
   determining whether the configuring of the dataflow circuitry is valid; and
   responsive to a determination of a non-valid configuration, executing the computational task in a normal compute mode.

8. The method of claim 1, further comprising:
   identifying, by a compiler, that a sequence of instructions, if scheduled sequentially, meets its own set of dependencies; and
   augmenting the sequence of instructions into the one or more dataflow instructions.

9. A system for performing dataflow execution by an accelerated processing unit (APU), comprising:
   instruction augmenting circuitry configured to augment a sequence of instructions into one or more dataflow instructions, responsive to the sequence of instructions meeting its own dependencies;
   setup circuitry configured to configure dataflow circuitry based on information from one or more dataflow instructions, the information being associated with dataflow execution of a computational task; and
   execution circuitry configured to execute the dataflow execution of the computational task using the dataflow circuitry.

10. The system of claim 9, wherein the setup circuitry dynamically configures the dataflow circuitry by programmable components based on one or more counters.

11. The system of claim 10, wherein the setup circuitry controls operational cycles of the dataflow circuitry by the programmable components.

12. The system of claim 10, wherein the setup circuitry controls connectivity among components of the dataflow circuitry by the programmable components.

13. The system of claim 9, wherein before executing, by the execution circuitry, the dataflow execution, the setup circuitry transitions the APU into a dataflow execution mode, during which a circuitry of the APU that is not used for the dataflow execution is placed in a power-gated or a clock-gated state.

14. The system of claim 13, wherein after executing, by the execution circuitry, the dataflow execution, the setup circuitry transitions the APU into a normal compute mode, activating the circuitry of the APU that was placed in a power-gated or a clock-gated state.

15. The system of claim 9, wherein the setup circuitry further determines whether the configuring of the dataflow circuitry is valid, and responsive to a determination of a non-valid configuration, the execution circuitry executes the computational task in a normal compute mode.

16. The system of claim 9, further comprising:
a compiler, the compiler identifies that a sequence of instructions, if scheduled sequentially, meets its own set of dependencies, and augments the sequence of instructions into the one or more dataflow instructions.

17. A non-transitory computer-readable medium comprising instructions, when executed on an accelerated processing unit (APU), perform a method for performing dataflow execution comprising:
augmenting a sequence of instructions into one or more dataflow instructions, responsive to the sequence of instructions meeting its own dependencies;
configuring dataflow circuitry based on information from one or more dataflow instructions, the information being associated with dataflow execution of a computational task; and
executing the dataflow execution of the computational task using the dataflow circuitry.

18. The non-transitory computer-readable medium of claim 17, wherein the configuring further comprises:
dynamically configuring the dataflow circuitry by programmable components, based on one or more counters, including:
controlling operational cycles of the dataflow circuitry by the programmable components, and
controlling connectivity among components of the dataflow circuitry by the programmable components.

19. The non-transitory computer-readable medium of claim 17, wherein the method further comprises:
before the executing of the dataflow execution, transitioning the APU into a dataflow execution mode, during which a circuitry of the APU that is not used for the dataflow execution is placed in a power-gated or a clock-gated state.

20. The non-transitory computer-readable medium of claim 19, wherein the method further comprises:
after the executing of the dataflow execution, transitioning the APU into a normal compute mode, activating the circuitry of the APU that was placed in a power-gated or a clock-gated state.

* * * * *